(12) United States Patent
Merkel et al.

(10) Patent No.: US 6,454,072 B1
(45) Date of Patent: Sep. 24, 2002

(54) ANNULAR FRICTION-CLUTCH FACING FOR A MULTI-DISK CLUTCH

(75) Inventors: Harald Merkel, Sinsheim; Josef Kohler, Heidelberg, both of (DE)

(73) Assignee: Borg-Warner Automotive GmbH, Ketsch (DE)

( * ) Notice: Subject to any disclaimer, the term of this patent is extended or adjusted under 35 U.S.C. 154(b) by 0 days.

(21) Appl. No.: 09/702,447

(22) Filed: Oct. 31, 2000

(51) Int. Cl.[7] .............................................. F16D 65/84
(52) U.S. Cl. ............................ 192/70.12; 192/107 R; 192/113.36
(58) Field of Search ....................... 192/70.14, 107 R, 192/113.36, 70.12

(56) References Cited

U.S. PATENT DOCUMENTS

| | | | |
|---|---|---|---|
| 2,523,501 A | 9/1950 | Davies et al. | 192/69 |
| 2,869,701 A | 1/1959 | Yokel | 192/85 |
| 2,927,673 A | 3/1960 | Sand | 192/69 |
| 3,048,250 A | 8/1962 | Kersimer | 192/107 |
| 3,249,189 A | 5/1966 | Schjolin et al. | 192/69 |
| 3,586,134 A * | 6/1971 | Westfall | 188/71.6 |
| 3,834,503 A | 9/1974 | Maurer et al. | 192/113 |
| 3,897,860 A | 8/1975 | Borck et al. | 192/113 |
| 4,022,298 A * | 5/1977 | Malinowski | 188/71.6 |
| 4,134,483 A | 1/1979 | Horsch | 192/113 B |
| 4,205,739 A | 6/1980 | Shelby et al. | 192/113 |
| 4,270,647 A | 6/1981 | Leber | 192/113 |
| 4,450,944 A | 5/1984 | Fujioka et al. | 192/70.12 |
| 4,667,798 A | 5/1987 | Sailer et al. | 192/70.12 |
| 4,730,713 A | 3/1988 | Pickard et al. | 192/85 |
| 4,827,784 A | 5/1989 | Muller et al. | 74/330 |
| 4,913,267 A * | 4/1990 | Campbell et al. | 188/218 |
| 5,174,420 A | 12/1992 | DeWald et al. | 188/264 |
| 5,305,863 A | 4/1994 | Gooch et al. | 192/70 |
| 5,469,943 A | 11/1995 | Hill et al. | 188/264 |
| 5,495,927 A | 3/1996 | Samie et al. | 192/70.12 |
| 5,538,121 A | 7/1996 | Hering | 192/70.12 |
| 5,577,588 A | 11/1996 | Raszkowski | 192/113.35 |
| 5,613,588 A | 3/1997 | Vu | 192/113.35 |
| 5,669,474 A | 9/1997 | Dehrmann et al. | 192/3.29 |
| 5,755,314 A | 5/1998 | Kanda et al. | 192/70.12 |
| 5,791,447 A | 8/1998 | Lamela | 192/70.25 |
| 5,810,142 A | 9/1998 | Schaefer | 192/70.12 |
| 5,813,508 A | 9/1998 | Shoji et al. | 192/113.34 |

FOREIGN PATENT DOCUMENTS

DE          31 18 565 A1         11/1982

* cited by examiner

*Primary Examiner*—Saul Rodriguez
(74) *Attorney, Agent, or Firm*—Bliss McGlynn, P.C.

(57) ABSTRACT

An annular friction-clutch facing (30) for a multi-disk clutch (10) includes an inner edge (32) and an outer edge (34) defining a width (w) of the facing (30). The facing (30) further includes a first group of grooves (136, 236) formed on the facing (30) and having first cross-sectional area. Each groove of the first group (136, 236) has a first opening (38) at the outer edge (34) and a second opening (40) at the inner edge (32) remote from the first opening (38) and is adapted to direct lubricating agents across the width (w) over a substantial area of the facing (30). The facing (30) further includes a second group of grooves (42) formed on the facing (30) and having a second cross-sectional area smaller than the first cross-sectional area. The second group of grooves (42) includes first and second sets of grooves (44, 46, respectively). The grooves of the first set (44) are disposed in intersecting relationship with the grooves of the second set (46). The second group of grooves (42) is adapted to remove excess of the lubricating agents on the facing (30).

17 Claims, 3 Drawing Sheets

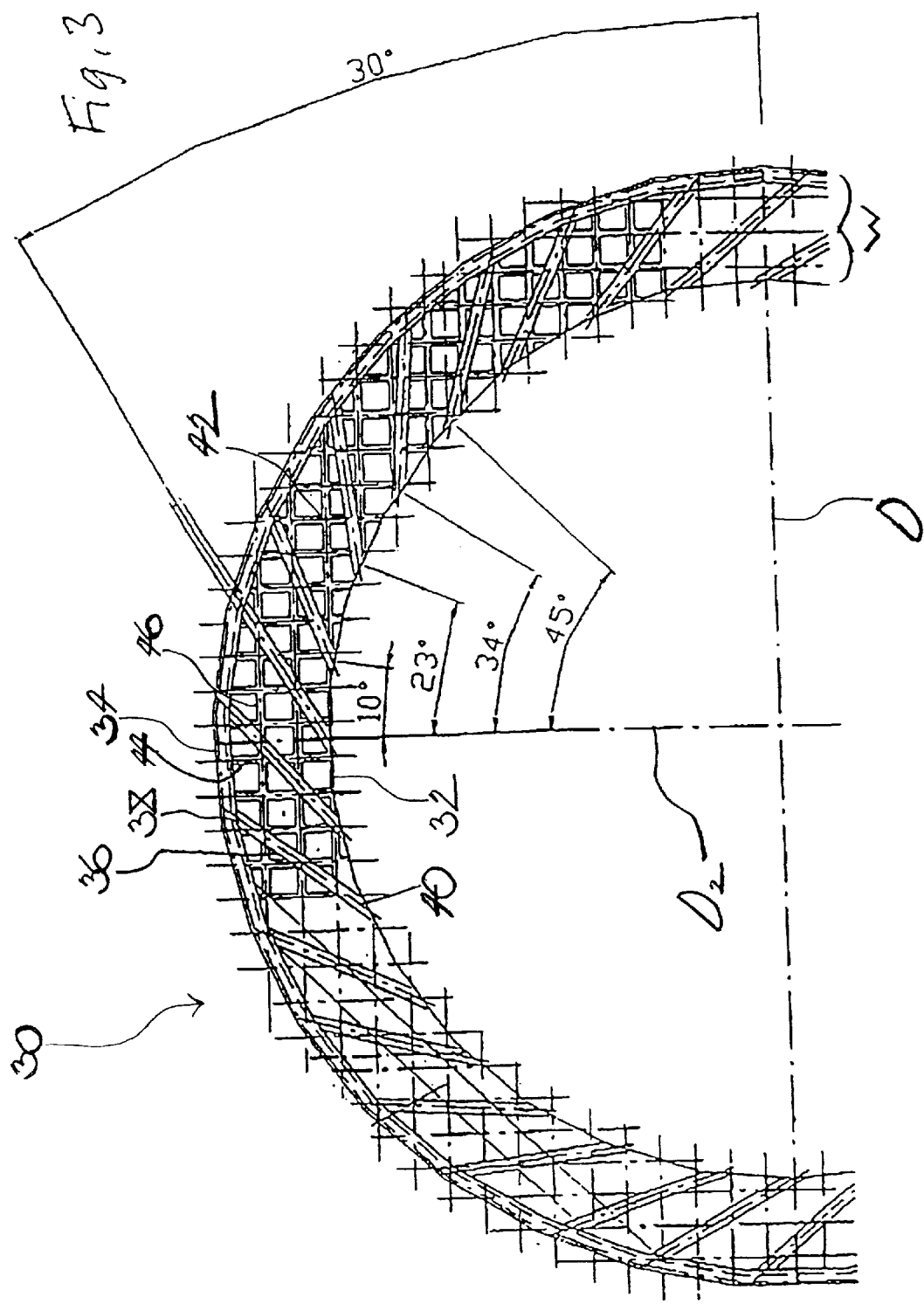

ANNULAR FRICTION-CLUTCH FACING FOR A MULTI-DISK CLUTCH

BACKGROUND OF THE INVENTION

1. Field of the Invention

The present invention relates, generally, to multi-disk devices. More specifically, the present invention relates to friction facings for multi-disk devices having improved lubrication characteristics.

2. Description of the Related Art

Multi-disk friction devices are employed in a wide range of applications as clutches or brakes. For example, such devices are frequently used in land-based vehicles. Generally speaking, such vehicles require three basic components: a power plant (such as an internal-combustion engine), a powertrain, and wheels. The powertrain's main component is typically referred to as the "transmission." Engine torque and speed are converted in the transmission in accordance with the tractive-power demand of the vehicle.

Transmissions include one or more gear sets, each of which may include an inner sun-gear, intermediate planet gears supported by their carriers, and outer ring-gears. Various components of each gear set are held or powered to change the gear ratios in the transmission. The multi-disk pack-clutch is a friction device that is commonly employed as a holding mechanism in a transmission or differential. In addition, multi-disk friction devices also find use in industrial applications, such as wet brakes for braking the wheels on earth-moving equipment.

The multi-disk pack-clutch or brake-assembly includes a plurality of ring-shaped disks and has a clutch subassembly. The subassembly includes a set of plates arranged in a torsionally rigid manner and fixed against displacement on a disk carrier as well as a set of friction disks interleaved between one another and fixed against displacement on a hub. The clutch or brake assembly also typically includes a piston. When a component of a gear set is to be held, as during a particular gear range, a piston is actuated to cause the plates and friction disks to come in contact with one another. The plates mutually engage in a gearing manner, and the friction disks mutually engage in a gearing manner. The gear sets are mutually displaceable relative to each other in an axial direction and can be brought into and out of engagement in pairs. In "open pack" operation, the plates and friction disks normally turn past one another without contact. In certain applications, it is known to employ several multi-disk friction devices in combination to establish different drive connections throughout the transmission or differential to provide various gear ratios in operation or to brake a component.

Multi-disk clutches or multi-disk brakes having disks that are interconnected, i.e., made in a single piece from frictional material, are also known in the related art. Examples of such devices are disclosed in DE 31 49 880 C2, DE 35 32 759 C1, and DE 31 18 565 A1.

Each friction disk includes a carrier plate made of, for instance, steel. The plate includes a friction surface on at least one annular face of the plate. The friction surface generally includes a fiber material manufactured from paper or a paper-like material. The structure of the plate surfaces is generally smooth. The confronting faces of the interleaved plates and friction disks are, therefore, covered with friction surfaces. WO 97/32678 discloses a special plate-surface structure made of steel and used to improve the coefficient of friction in the pairings of the friction disks and plates.

When a friction device is engaged, kinetic energy is converted into thermal energy and a considerable amount of heat is generated. If the friction surfaces get too hot, they can burn, which damages the friction surfaces and degrades the clutch's or brake's operational effectiveness, such as by wear and tear or lack of heat discharge. Additionally, the requirements placed on the service life of multi-disk clutches and similar units are exceptionally high. For example, during the service life of a clutch, the disks thereof are brought into and out of engagement with each other innumerable times, applying high axial forces and, thus, high surface pressures to each disk. Despite these requirements, the behavior of the power transmission is to remain unchanged, and each disk is to be provided a long service life. Failure of one or more disks leads to failure of the entire unit. And, the removal of defective disks and the installation of new ones are very laborious. Therefore, maintaining the behavior of the power transmission and providing a long service life for the disks are of utmost economic importance.

As a result, in the power-transmission units discussed above, lubrication of the individual components plays an important role. It must be ensured, in particular, that lubricating oil reaches the friction surfaces of the disks. For this purpose, lubricating oil is typically sprayed onto the friction surfaces. High temperatures are maintained, to the extent possible, within limits by the lubricating oil.

It is known in the related art to provide the friction surfaces with a porous, sponge-like structural arrangement, among others, such that a certain amount of oil storage is achieved. The stored oil is supplied to the friction surfaces when the clutch is applied.

Many causes of the failure of disks having such structural arrangement and others have already been examined. Such causes include improper lubrication, excessive frictional work or performance, and unfavorable properties of the friction lining.

Accordingly, there remains a need in the art for a power-transmission unit—in particular, a multi-disk friction device, such as a clutch or brake—the service life of which is increased as compared with known units and breakdowns of the disks of which are avoided. The present invention arranges the disks such that lubrication is optimized so that they transmit torque in an improved manner.

SUMMARY OF THE INVENTION

The present invention overcomes the disadvantages in the related art in an annular friction-clutch facing for a multi-disk clutch. The facing includes an inner edge and an outer edge defining a width of the facing. The facing further includes a first group of grooves formed on the facing and having a first cross-sectional area. Each groove of the first group has a first opening at the outer edge and a second opening at the inner edge remote from the first opening and is adapted to direct lubricating agents across the width over a substantial area of the facing. The facing further includes a second group of grooves formed on the facing and having a second cross-sectional area smaller than the first cross-sectional area. The second group of grooves includes first and second sets of grooves. The grooves of the first set are disposed in intersecting relationship with the grooves of the second set. The second group of grooves is adapted to remove excess of the lubricating agents on the facing.

Accordingly, one advantage of the present invention is that the friction facings are provided with grooves that ensure that the working face is provided with a residual supply of lubricating oil.

Another advantage of the present invention is that the grooves discharge the heat incurred during the "closed pack" operating mode of the friction device.

Still, another advantage of the present invention is that the grooves improve the friction properties of the multi-disk friction device.

Still, another advantage of the present invention is that relatively large streams of lubricating oil flow in the grooves, thereby substantially improving the way frictional heat is carried off within the clutch and, thus, contributing to the increased service life of the disks.

Still, another advantage of the present invention is that the grooves entirely wet the friction surfaces with lubricating oil by supplying remote areas of the disks with lubricating oil at all speeds occurring during operation of the disks.

Still, another advantage of the present invention is that the grooves counteract the formation of a film by the lubricating oil.

Still, another advantage of the present invention is that energy density is increased considerably—the size of the disks can be reduced while maintaining the frictional work, or the frictional work can be increased by maintaining the size of the disks.

Still, another advantage of the present invention is that the streams of lubricating oil within the grooves do not obstruct the absorption of load upon engagement of the disks such that no time delay occurs.

Finally, these advantages are achieved in an annular friction-clutch facing for a multi-disk clutch that is operationally efficient and cost-effective to manufacture relative to such facings known in the related art.

BRIEF DESCRIPTION OF THE DRAWINGS

Other advantages of the present invention will be readily appreciated as the same becomes better understood by reference to the following detailed description when considered in connection with the accompanying drawings, wherein:

FIG. 3 is an enlarged top view of the facing of the present invention showing the first and second groups of grooves oriented on the facing in the manner shown in the preferred embodiment of FIG. 1.

DETAILED DESCRIPTION OF THE PREFERRED EMBODIMENT(S)

Figure 1:
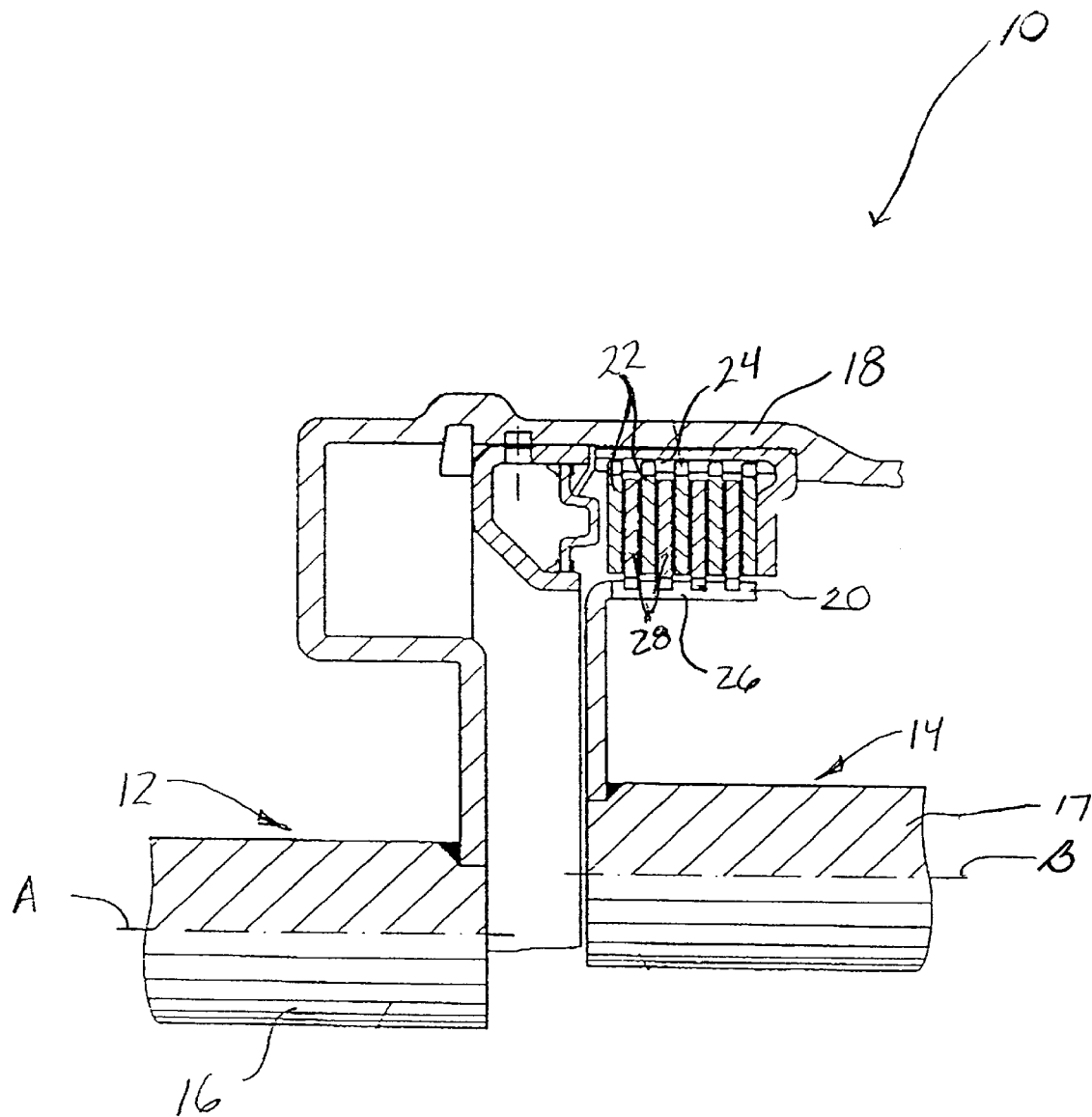
FIG. 1 is a partial cross-sectional side view of a multi-disk friction device of the present invention.

Referring now to FIG. 1, a multi-disk friction device, such as a clutch or brake assembly, is generally indicated at 10. The friction device 10 is adapted to be employed in connection with a transmission, differential, or brake system. For example only and not by way of limitation, as is commonly known in the art, but not shown in these figures, transmission assemblies of transmission systems typically include an input shaft that is operatively coupled to a prime mover, such as an internal-combustion engine. In an automotive application, the transmission assembly also includes an output shaft that is operatively coupled to driven wheels through other drive-train components, such as a drive shaft and an axle having a differential. At least one gear set (often, a plurality of gear sets) is operatively coupled between the input and output shafts. A transmission casing supports the input and output shafts and gear sets of the transmission assembly.

Various components of the gear sets are held or powered to change the gear ratio in the transmission. To this end, the transmission assembly will typically include at least one friction device 10. However, it will be appreciated by those having ordinary skill in the art that the transmission assembly may employ any number of friction devices adapted to hold or power the gear sets to change the gear ratio of the transmission. Further and notwithstanding the automotive-related context of the discussion above, from the description that follows, those having ordinary skill in the art will appreciate that the present invention may be employed in a transmission, differential, or brake system whether used in an automotive, non-automotive, or industrial application. Thus, to the extent the term "clutch" is used below in any context, this term should be given its broadest possible meaning, including, but not limited to, clutches and brakes for use in transmission, differential, or braking systems of all types.

As shown in FIG. 1, the friction device, or clutch assembly 10, is provided with a drive member, generally indicated at 12, and a driven member, generally indicated at 14. The drive member 12 includes a drive shaft 16. FIG. 1 shows the drive shaft 16 rigidly connected to a disk carrier 18 for rotation of the drive shaft 16 and the disk carrier 18 about axis "A" as will be described in greater detail below. Similarly, the driven member 14 includes a driven shaft 17 and a driven hub 26. The driven hub 26 may include axially extending splines 20 disposed about the annular periphery of the driven hub 26. A plurality of annular, outer drive disks 22 are splined or otherwise mounted at 24 for movement in the axial direction relative to the disk carrier 18 and are supported by 24 for rotation about axis "A." A plurality of annular, inner driven disks 28 are splined or otherwise mounted to and carried by the splines 20 for rotation about axis "B." Thus, the outer drive disks 22 and the inner driven disks 28 are interleaved and rotate past one another when the clutch 10 is in "open pack" mode as is commonly known in the art.

Each disk 22, 28 includes a working face having a predetermined thickness and can be brought into engagement with a working face of an adjacent disk 22, 28 to transmit a torque to the adjacent disk 22, 28. The working faces include a treated surface that frictionally engages a like surface on the adjacent disk 22, 28 as will be described in greater detail below. In a preferred embodiment, each disk 22, 28 is made of metal.

More specifically, the working faces of the disks 22, 28 are provided with an annular friction-clutch facing, generally indicated at 30 in FIGS. 2a, 2b, 2c, and 3, where like numerals, some of which have been increased by a factor of 100, are used to designate like structure. In a preferred embodiment, the friction-clutch facing 30 is made of a paper-like substance. Each facing 30 cooperates in an engaged state with the working face of an adjacent disk 22, 28. In the operative mode, the working faces are bathed with a lubricating agent, such as oil, forming an oil film (not shown).

In accordance with the present invention, each facing 30 includes an inner edge 32 and an outer edge 34 defining a width (w) of the facing 30. The facing 30 further includes a first group of grooves 36 formed on the facing 30 and having a first cross-sectional area. Each groove of the first group 36 has a first opening 38 at the outer edge 34 and a second opening 40 at the inner edge 32 remote from the first opening 38. The grooves of the first group 36 are adapted to direct lubricating agents across the width (w) over a substantial area of the facing 30. The facing 30 further includes a second group of grooves 42 formed on the facing 30 and having a second cross-sectional area smaller than the first cross-sectional area. The second group of grooves 42 includes a first set of grooves 44 and a second set of grooves 46. The grooves of the first set 44 are disposed in intersecting relationship with the grooves of the second set 46. The second group of grooves 42 is adapted to remove excess of the lubricating agents on the facing 30.

The grooves of the first group 36 can be designed to have many orientations, like radials or secants. In one preferred embodiment shown in FIGS. 2a and 3, the grooves of the first group 36 extend radially across the width (w) such that each of the grooves of the first group 36 defines a continuously changing angle with respect to a line defining a diameter $D_1$ of the facing. For example, one groove 36 is shown extended at a 40° angle in FIG. 2a and at a 30° angle in FIG. 3 with respect to a diameter $D_1$ of the facing 30. The angle of each other groove 36 relative to the diameter $D_1$ changes. As can be easily seen in FIG. 3, grooves of the first group 36 may be spaced unevenly from other grooves of the first group 36. For example, measuring from a line defining a diameter $D_2$ of the facing 30, the first groove 36 is spaced 10° with respect to the diameter $D_2$. Three other grooves 36 are also shown extending radially across the width (w) at 23°, 34°, and 45°, respectively, from the diameter $D_2$.

Figure 2A:
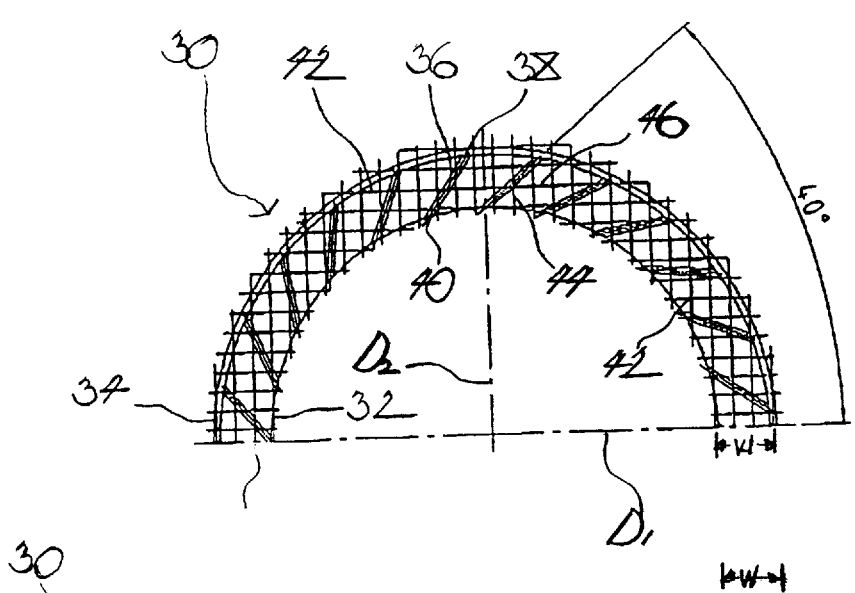
FIG. 2a is a top view of the facing of the present invention showing the first and second groups of grooves oriented on the facing in a preferred embodiment.
Figure 2B:
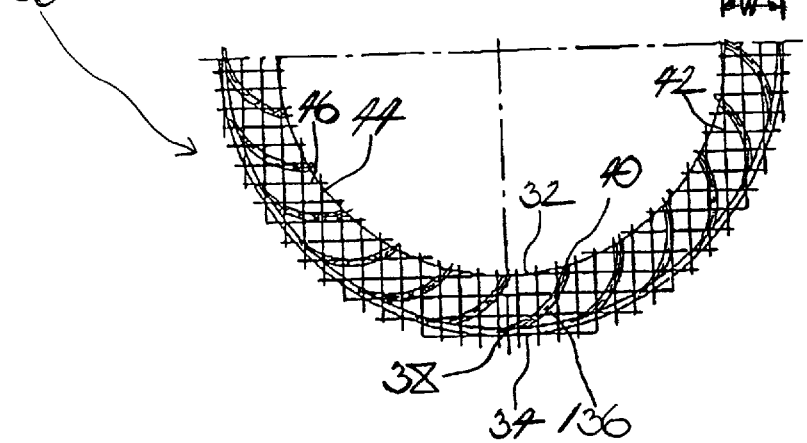
FIG. 2b is a top view of the facing of the present invention showing the first and second groups of grooves oriented on the facing in another preferred embodiment.

In another preferred embodiment shown in FIG. 2b, the grooves of the first group 136 are spaced in equal increments relative to adjacent grooves 136 and extend arcuately across the width (w) of the facing 30. In this manner, the grooves 136 are shaped similarly to the curve of pump blades. The curve of the grooves 136 is to be adjusted to follow the direction of rotation of the facing 30. In the embodiment of FIG. 2b, the direction of rotation of the facing 30 is counter-clockwise.

Figure 2C:
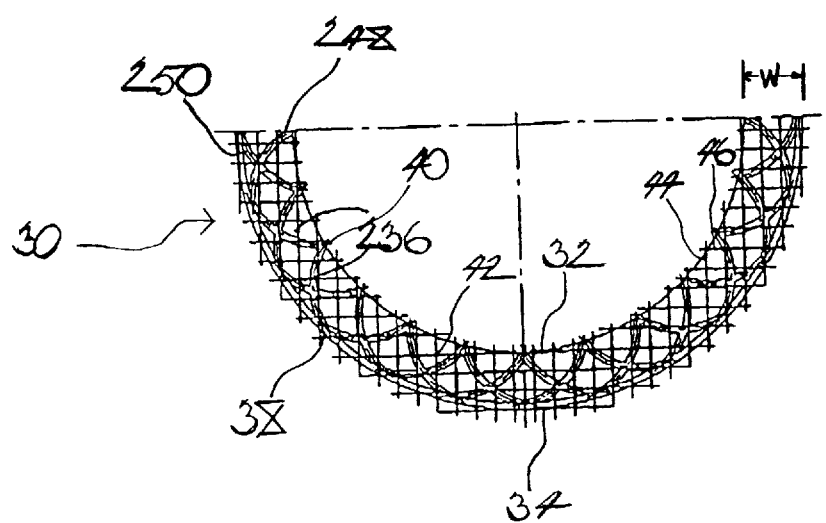
FIG. 2c is a top view of the facing of the present invention showing the first and second groups of grooves oriented on the facing in a further preferred embodiment.

In yet another preferred embodiment shown in FIG. 2c, the first group of grooves 236 includes a first predetermined sub-group of grooves 248 that extend arcuately in one direction across the width (w) and are spaced in equal increments relative to adjacent grooves 248 and a second predetermined sub-group of grooves 250 that extend arcuately in a direction opposite to that of the grooves 248 across the width (w) and are spaced in equal increments relative to adjacent grooves 250. In this embodiment, the grooves 248, 250 are arranged independently of the direction of rotation of the facing 30.

Each of these preferred embodiments also includes a second group of grooves 42 that, in turn, includes a first and second set of grooves 44, 46. The grooves of the first set 44 are disposed in parallel relationship with each other, extend radially across the width (w), and are disposed in perpendicular relationship, or at 90°, to the grooves of the second set 46. In other words, the second group of grooves 42 is arranged in a meshwork or grating manner. This could also be referred to as a "waffle" pattern. In this case, it is essential that the lubricating oil be distributed over the facing 30 as planarly as possible such that no substantial hydrodynamic lubricating film arises during engagement of the disks 22, 28. However, those having ordinary skill in the art will appreciate that the grooves of the first set 44 can deviate from extending radially across the width (w) and intersect the grooves of the second set 46 at any angle. The grooves of the first and second sets, 44, 46, respectively, are not deeply formed in the facing 30, either. Further, adjacent grooves of the first group 36, 136, 236 are disposed one to the other at a first spaced increment, and adjacent grooves of the second group 42 are disposed one to the other at a second spaced increment that is smaller than the increment between the grooves of the first group 36.

The first group of grooves 36, 136, 236 as well as the second group of grooves 42 can have various relative sizes and shapes. For instance, the grooves of the first group 36, 136, 236 can be formed deeply within the facing 30 and may define sharp edges on the facing 30. In a preferred embodiment, the facing 30 defines a depth, and the grooves of the first group 36, 136, 236 are defined into the depth to a greater extent than the grooves of the second group 42 are defined into the depth. Specifically, the grooves of the first group 36, 136, 236 are twice as deep as the grooves of the second group 42. However, those having ordinary skill in the art will appreciate that the depth of the grooves 36, 136, 236 can be greater by any multiple of the depth of the grooves 42. In another preferred embodiment, the grooves of the first group 36, 136, 236 are even formed entirely through the depth of the facing 30.

The grooves of the second group 42 have a second predetermined width, and the grooves of the first group 36, 136, 236 have a first predetermined width that is substantially greater than the second predetermined width. Particularly, the width of the grooves of the first group 36, 136, 236 is twice as great as the width of the grooves of the second group 42. However, those having ordinary skill in the art will appreciate that the width of the grooves 36, 136, 236 can be greater by any multiple of the width of the grooves 42. In addition, the number of grooves of the second group 42 is greater than the number of grooves of the first group 36, 136, 236.

The grooves are formed on at least one, and preferably all, of the facings 30 for the storage of lubricating agents. Those having ordinary skill in the art will appreciate from the description herein that the grooves may be formed on either one of or both adjacent sides of adjacent disks 22, 28.

The structure of the facings 30 can be produced by any method for applying or removing material, including mechanical means. Non-mechanical means are also possible to achieve the desired structure of the grooves. A laser treatment of the facings 30 may also be employed.

In operation, the combination of the first and second groups of grooves 36, 42, respectively, is optimal. The first group of grooves 36, 136, 236 is arranged and disposed in such a way that a pumping effect is produced. The grooves of the first group 36, 136, 236 are also provided with a relatively large cross-section such that large quantities of lubricating oil can be conveyed. The lubricating oil is, thus, effectively circulated by the first group of grooves such that the lubricating oil covers the entire surface of the disks 22, 28. The second group of grooves 42 is used to remove excessive lubricating oil and, thus, reduce hydrodynamic effects that could lead to "floating" of the facings 30 on the oil film. The grooves 36, 136, 236, 42 ensure that the facings 30 of the disks 22, 28 are provided with a residual supply of lubricating oil and prevent any dry running in the contact zone between the inner disks 22, 28.

As a result, the grooves 36, 136, 236, 42 lead to improvements of the friction properties of the facings 30 and, thus, the disks 22, 28, including constancy of the coefficient of friction and power absorption during the shifting operation. Furthermore, with the facings 30 of the kind discussed above, the grooves 36, 136, 236, 42 can be made to allow for a particular oil flow or catch oil in limited areas of the disk 22, 28 such that the heat incurred during the work of the friction device 10 is discharged.

More particularly, the grooves 36, 136, 236, 42 discharge the heat incurred during the "closed pack" operating mode and, thus, improve the friction properties of the friction device 10. Relatively large streams of lubricating oil flow in the grooves 36, 136, 236, 42, thereby substantially improving the way frictional heat is carried off within the clutch 10 and, thus, contributing to the increased service life of the disks 22, 28. The grooves 36, 136, 236, 42 entirely wet the facings 30 with lubricating oil by supplying remote areas of the disks 22, 28 with lubricating oil at all speeds occurring during operation of the disks 22, 28. The grooves 36, 136, 236, 42 counteract the formation of a film by the lubricating oil. Energy density is increased considerably—the size of the disks 22, 28 can be reduced while maintaining the frictional work, or the frictional work can be increased by maintaining the size of the disks 22, 28. The streams of lubricating oil within the grooves 36, 136, 236, 42 do not obstruct the absorption of load upon engagement of the disks 22, 28 such that no time delay occurs. Finally, the facing 30 is operationally efficient and cost-effective to manufacture relative to such facings known in the related art.

The invention has been described in an illustrative manner. It is to be understood that the terminology that has been used is intended to be in the nature of words of description rather than of limitation. Many modifications and variations of the invention are possible in light of the above teachings. Therefore, within the scope of the appended claims, the invention may be practiced other than as specifically described.

What we claim is:

1. An annular friction-clutch facing (30) for a multi-disk clutch (10) comprising:

an inner edge (32) and an outer edge (34) defining a width (w) of said facing (30);

a first group of grooves (136, 236) formed on said facing (30) and having a first cross-sectional area, each groove of said first group (136, 236) having a first opening (38) at said outer edge (34) and a second opening (40) at said inner edge (32) remote from said first opening (38) and adapted to direct lubricating agents across said width (w) over a substantial area of said facing (30); and a second group of grooves (42) formed on said facing (30) and having a second cross-sectional area smaller than said first cross-sectional area, said second group of grooves (42) including first and second sets of grooves (44, 46), the grooves of said first set (44) being disposed in intersecting relationship with the grooves of said second set (46), said second group of grooves (42) adapted to remove excess of the lubricating agents on said facing (30), and wherein said first group of grooves (236) includes a first predetermined sub-group of grooves (248) that extend arcuately in one direction across said width (w) and are spaced in equal increments relative to adjacent grooves of said first predetermined sub-group (248) and a second predetermined sub-group of grooves (250) that extend arcuately in a direction opposite to that of the grooves of said first predetermined sub-group (248) across said width (w) and are spaced in equal increments relative to adjacent grooves of said second predetermined sub-group (250).

2. An annular friction-clutch facing (30) for a multi-disk clutch (10) as set forth in claim 1, wherein the grooves of said first set (44) are disposed in parallel relationship with each other.

3. An annular friction-clutch facing (30) for a multi-disk clutch (10) as set forth in claim 1, wherein the grooves of said first set (44) extend radially across said width (w).

4. An annular friction-clutch facing (30) for a multi-disk clutch (10) as set forth in claim 1, wherein the grooves of said first set (44) are disposed in perpendicular relationship to the grooves of said second set (46).

5. An annular friction-clutch facing (30) for a multi-disk clutch (10) as set forth in claim 1, wherein adjacent grooves of said first group (136, 236) are disposed one to the other at a first spaced increment and adjacent grooves of said second group (42) are disposed one to the other at a second spaced increment that is smaller than the first spaced increment.

6. An annular friction-clutch facing (30) for a multi-disk clutch (10) as set forth in claim 1, wherein said facing (30) defines a depth and the grooves of said first group (136, 236) are defined into said depth to a greater extent than the grooves of said second group (42) are defined into said depth.

7. An annular friction-clutch facing (30) for a multi-disk clutch (10) as set forth in claim 6, wherein the grooves of said first group (136, 236) are twice as deep as the grooves of said second group (42).

8. An annular friction-clutch facing (30) for a multi-disk clutch (10) as set forth in claim 6, wherein the grooves of said first group (136, 236) are formed entirely through said depth of said facing (30).

9. An annular friction-clutch facing (30) for a multi-disk clutch (10) as set forth in claim 1, wherein the grooves of said second group (42) have a second predetermined width and the grooves of said first group (136, 236) have a first predetermined width that is substantially greater than the second predetermined width.

10. An annular friction-clutch facing (30) for a multi-disk clutch (10) as set forth in claim 9, wherein the width of the grooves of said first group (136, 236) is twice as great as the width of the grooves of said second group (42).

11. An annular friction-clutch facing (30) for a multi-disk clutch (10) as set forth in claim 1, wherein the number of grooves of said second group (42) is greater than the number of grooves of said first group (136, 236).

12. A multi-disk friction device (10) comprising:

a drive member (12) having a plurality of drive disks (22) supported for rotation with said drive member (12) and a driven member (14) having a plurality of driven disks (28) supported for rotation with said driven member (14), said drive and driven disks (22, 28) interleaved relative to each other such that each drive disk (22) is adjacent a driven disk (28) and moveable toward and away from one another for providing selective frictional engagement therebetween and to transmit torque between said drive and driven members (12, 14);

each of said drive and driven disks (22, 28) including an annular facing (30) that is disposed for frictional engagement with annular facings (30) of an adjacent one of said disks (22, 28), at least one of said annular facings (30) on said adjacent one of said disks (22, 28) including an inner edge (32) and an outer edge (34) defining a width (w) of said facing (30), a first group of grooves (136, 236) formed on said facing (30) having a first relatively larger cross-sectional area, each groove of said first group (136, 236) having an opening (38) at said outer edge (34) and an opening (40) at said inner edge (32) remote from said other opening (38) and adapted to direct lubricating agents across said width (w) over a substantial area of said facing (30), and a second group of grooves (42) formed on said facing (30) having a second smaller cross-sectional area relative to said first group of grooves (136, 236), said second group of grooves (42) including first and second sets of grooves (44, 46), the grooves of said first set (44) being disposed in intersecting relationship with the grooves of said second set (46), with said second group of grooves (42) adapted to remove excess of the lubricating agents on said facing (30), and wherein said first group of grooves (236) includes a first predetermined sub-group of grooves (248) that extend arcuately in one direction across said width (w) and are spaced in equal increments relative to adjacent grooves of said first predetermined sub-group (248) and a second predetermined sub-group of grooves (250) that extend arcuately in a direction opposite to that of the grooves of said first predetermined sub-group (248) across said width (w) and are spaced in equal increments relative to adjacent grooves of said second predetermined sub-group (250).

13. A multi-disk friction device (10) as set forth in claim 12, wherein the grooves of said first set (44) are disposed in parallel relationship with each other.

14. A multi-disk friction device (10) as set forth in claim 12, wherein the grooves of said first set (44) extend radially across said width (w).

15. An annular friction-clutch facing (30) for a multi-disk clutch (10) comprising:

an inner edge (32) and an outer edge (34) defining a width (w) at said facing (30);

a first group of grooves (136, 236) formed on said facing (30) and having a first cross-sectional area, each groove of said first group (136, 236) having a first opening (38) at said outer edge (34) and a second opening (40) at said inner edge (32) remote from said first opening (38) and adapted to direct lubricating agents across said width (w) over a substantial area of said facing (30), and a second group of grooves (42) formed on said facing (30) and having a second cross-sectional area smaller than said first cross-sectional area, said second group of grooves (42) including first and second sets of grooves (44, 46), the grooves of said first set (44) being disposed in intersecting relationship with the grooves of said second set (46), said second group of grooves (42) adapted to remove excess of the lubricating agents on said facing (30), and wherein said facing (30) defines a depth and the grooves of said first group (136, 236) are defined into ad depth to a greater extent than the grooves of said second group (42) are defined into said depth.

16. An annular friction-clutch facing (30) for a multi-disk clutch (10) as set for in claim 15, wherein the grooves of said first group (136, 236) are twice as deep as the grooves of said second group (42).

17. An annular friction-clutch facing (30) for a multi-disk clutch (10) asset forth in claim 15, wherein the grooves of said first group (136, 236) are formed entirely through said depth of said facing (30).

* * * * *